3,674,518
REFRACTORY DRESSING METHOD
Jean-Claude Vuaroqueaux, La Celle-Saint-Cloud-Jonchere, France, assignor to Toseco International Limited, Birmingham, England
No Drawing. Filed Jan. 19, 1970, Ser. No. 4,094
Int. Cl. B28b 7/38
U.S. Cl. 106—38.27          5 Claims

ABSTRACT OF THE DISCLOSURE

The base and walls of ingot moulds may be protected against molten metal erosion in use by applying a refractory dressing of a magnesium aluminate, e.g. a crushed aluminous slag, together with an inorganic binding agent therefor, in a liquid medium.

DESCRIPTION OF THE INVENTION

This invention relates to the protection of ingot moulds against erosion by molten metal and to refractory compositions suitable for use as a dressing for the bottom plate or base of an ingot mould.

Ingot moulds usually have tapered walls and accordingly as the wider end is at the top or bottom of the mould are referred to as wide-end-up or wide-end-down moulds. In the case of wide-end-up moulds the base of the mould is usually integral with its sides and the ingot is removed from the mould by simply lifting it out of the mould. With wide-end-down moulds this is not practicable, and accordingly such moulds are commonly constructed of a casing constituting the walls of the mould resting on a bottom plate or so-called "stool." Stripping of the ingot is then achieved by lifting away the casing, leaving the ingot standing on the bottom plate.

In either form of mould the molten metal, e.g. steel, is commonly poured in from the top and thus impacts upon the base or bottom plate of the mould. The impact of the hot metal on the base or bottom plate erodes it so that eventually the mould, if it has an integral base, has to be discarded, or the bottom plate has to be replaced. It is an object of the present invention to provide a method of protecting such ingot moulds by providing a refractory dressing which when applied to the interior, i.e. walls or base or bottom plate, of an ingot mould decreases the erosion thereof and so prolongs the life of the mould or of the bottom plate, and which reduces the tendency of the cast ingot to stick to the walls, base or bottom plate of the mould.

According to the present invention there is provided a method of protecting the base and walls of ingot moulds against erosion by molten metal which comprises applying thereto a refractory dressing which comprises a particulate refractory material comprising crushed aluminous slags and an inorganic binding agent for said particulate material, dispersed in a liquid medium.

The crushed aluminous slags of this invention are preferably those which are produced in the production of ferro-alloys by aluminothermic processes. These slags are highly aluminous, in that they contain alumina ($Al_2O_3$) but other oxides are also often present e.g. magnesium and calcium oxides, and the oxides of the ferro alloy being manufactured, e.g. $TiO_2$, $V_2O_5$ and $MnO_2$. In the case where calcium oxide is present, it is preferable that this constituent does not exceed 4% by weight of the slag.

Particularly preferred slags are those containing both magnesium and aluminium oxides in the form of magnesium aluminates. These may be produced by various electrometallurgical processes, or synthetically. Thus, according to a particular feature of the invention, there is provided a method of protecting the base and walls of ingot moulds against erosion by molten metal which comprises applying thereto a refractory dressing which comprises a particulate refractory material comprising magnesium aluminate, and an inorganic binding agent for said particulate material, dispersed in a liquid medium. The magnesium aluminate containing material preferably contains 70–90% by weight $Al_2O_3$ and 10–20% by weight MgO. It may also contain 1–4% by weight $V_2O_5$.

The liquid medium is usually water, but can be a lower alcohol such as isopropanol.

The inorganic binding agents may be one or a mixture of two or more of alkali metal silicates, colloidal silica sol, alkali metal phosphates (particularly sodium hexametaphosphate, metal borates, boric acid, aluminium phosphate and phosphoric acid per se.

Crushed aluminous slags and magnesium aluminates may be used as hydraulic cements, and in view of their tendency to set quickly, it is usually desirable to add a material which will retard the setting rate. Particularly useful for this purpose are alkali metal phosphates, which will also act as inorganic binders; however common salt (NaCl) is also effective as a retardant.

In the preparation of the refractory dressings of this invention the solid aluminous slag or magnesium aluminate material is preferably placed in a ball-mill, and crushed to a degree of fineness exceeding −30 mesh BSS preferably −100 mesh BSS, and more preferably −200 mesh BSS. This crushing renders the dressings suitable for application by spraying. The crushed material is, if desired, admixed with such powdered compounds as have been hereinbefore indicated.

The product may then be mixed with the liquid medium and applied e.g. by spraying, or alternatively may be stored as a powder for future use.

Alternatively, the application of the dressings of this invention to, for example, a bottom plate (stool) may be effected by mixing the powder with a suitable amount of water to form a thick plastic slurry, which is then spread over the bottom plate, and allowed to set. There is thus provided a tough resilient coating for the stool, which serves to prevent or reduce erosion.

The bottom plate dressings formed by this invention retain a degree of elasticity, and are better able to withstand the impingement of a jet of molten metal during casting.

The following examples will serve to illustrate the invention:

EXAMPLE 1

A slag from the electrometallurgical industry and of the following constitution was ground in a ball-mill:

| | Percent by weight |
|---|---|
| $Al_2O_3$ | 80 |
| MgO | 15 |
| $V_2O_5$ | 2–3 |
| $SiO_2$ | [1] 0.3 |

[1] Impurities (including $Fe_2O_3$) up to 2.7%.

The material was crushed until it all passed through a −200 BSS mesh, and the resultant powder was formulated thus:

| | Percent by weight |
|---|---|
| Crushed slag | 80 |
| Sodium silicate (83.1% solids, $SiO_2$:$Na_2O$ ratio 2:1) | 12.5 |
| NaCl | 7.5 |

The mixture was then thoroughly mixed and made homogeneous, and then packed into bags for storage.

When required for use, 70% by weight of the powder, was added to 30% by weight of water, and the resultant slurry applied to the ingot mould base plate, so as to produce a coating between 1–100 mm.

On hardening, the dressing was hard and resilient, and withstood molten metal erosion. The castings obtained by this use are clean, and without fins or other imperfections.

EXAMPLE 2

The slag was of the same composition as in Example 1, and was treated the same way. Subsequently it was formulated thus:

| | Percent by weight |
|---|---|
| Crushed slag | 80.5 |
| Powdered sodium silicate (as in Example 1) | 10.5 |
| Sodium hydroxide | 5 |
| Anhydrous sodium dihydrogen phosphate | 4 |

The mixture was thoroughly mixed and when required for use admixed in the following proportions:

65% mixture by weight
35% water by weight

This mixture constituted an excellent bottom plate dressing affording very good and resilient bottom plate coatings. It was economical to produce.

EXAMPLE 3

A dressing was formulated as in Example 1, and coated onto a cast iron plate, and allowed to set.

The plate was then set at an angle of 45°, and molten metal poured onto the plate from a tundish situated directly above.

The metal stream was maintained for 190 seconds, and the bottom plate dressing allowed to cool. The dressing was then examined. The dressing of the present invention showed no flaking, cracking or erosion, whereas a standard bottom plate dressing, used as a control, was visibly eroded.

A series of comparative tests, substantially as described above, were carried out. The bottom plate dressings of this invention always showed themselves to be markedly superior.

I claim as my invention:

1. In the protection of the base and walls of ingot moulds against erosion by molten metal the step of applying thereto a refractory dressing which consists substantially of a particulate refractory material consisting substantially of magnesium aluminate slag, and an inorganic binding agent for said particulate material, dispersed in a liquid medium, said magnesium aluminate slag containing 70–90% by weight $Al_2O_3$ and 10–20% by weight MgO and said inorganic binding agent being at least one member selected from the class consisting of alkali metal silicates, alkali metal phosphates, boric acid, aluminium phosphate and phosphoric acid.

2. A method according to claim 1 wherein the magnesium aluminate material contains 1–4% $V_2O_5$.

3. A method according to claim 1 where the liquid medium is water.

4. A method according to claim 1 wherein the inorganic binding agent is sodium hexametaphosphate.

5. A method according to claim 1 wherein the particulate refractory material will all pass a 200 BSS mesh.

References Cited

UNITED STATES PATENTS

| 1,770,684 | 7/1930 | De Witt | 117—5.2 X |
| 3,230,056 | 1/1966 | Arant et al. | 117—5.3 X |
| 3,455,705 | 7/1969 | Rusher | 117—5.3 X |

LORENZO B. HAYES, Primary Examiner

U.S. Cl. X.R.

106—84, 117; 117—5.1, 5.3; 164—33, 72